July 24, 1962
D. R. COMPTON ETAL
3,045,896
PUMP
Filed Nov. 12, 1959
2 Sheets-Sheet 1
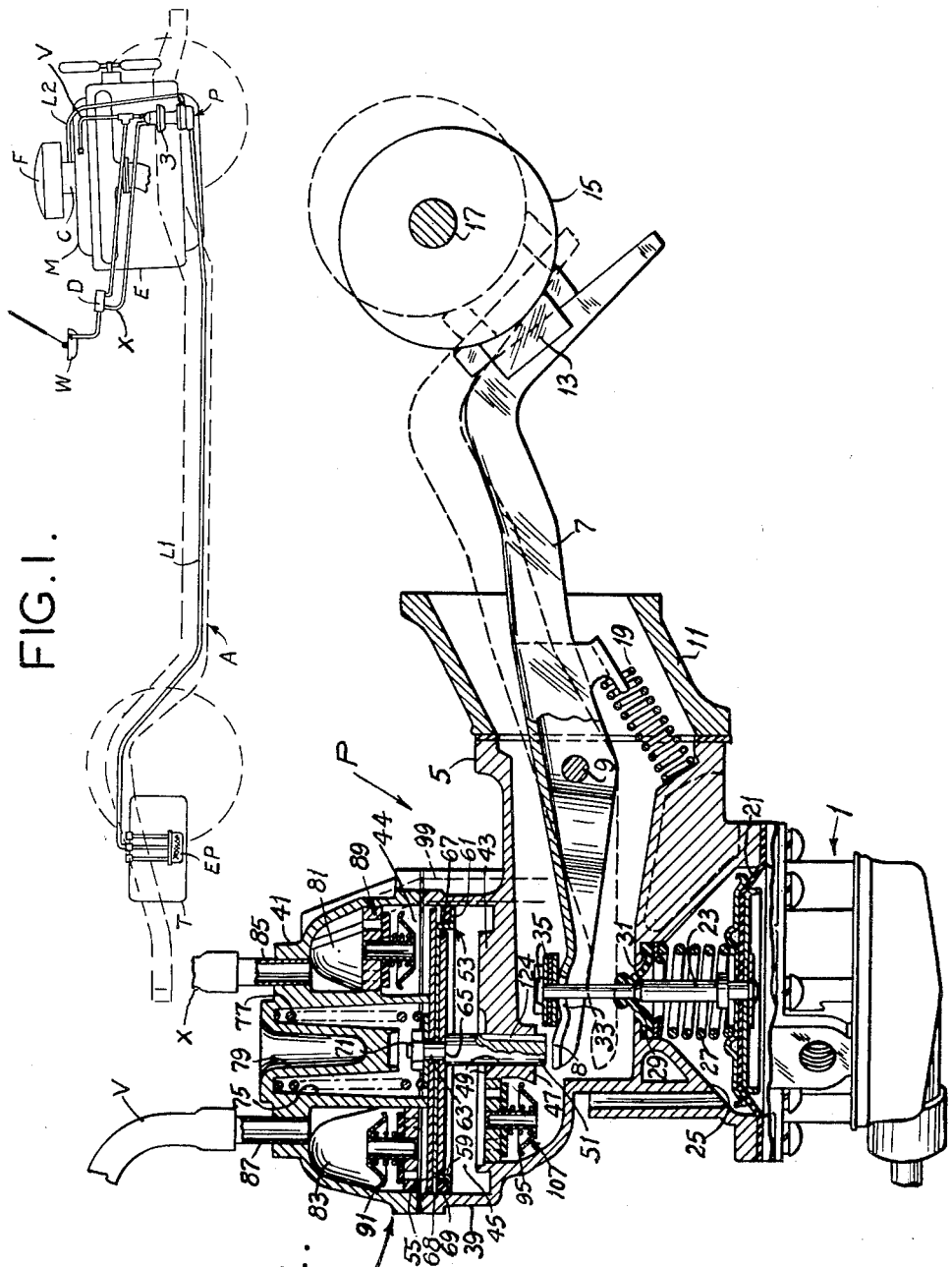
INVENTORS
DONALD R. COMPTON
JOHN P. PRATZKI
BY
AGENT July 24, 1962 D. R. COMPTON ET AL 3,045,896
PUMP
Filed Nov. 12, 1959 2 Sheets-Sheet 2
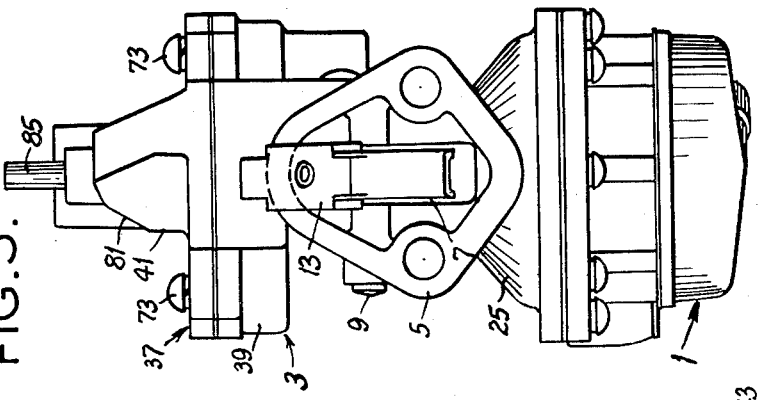
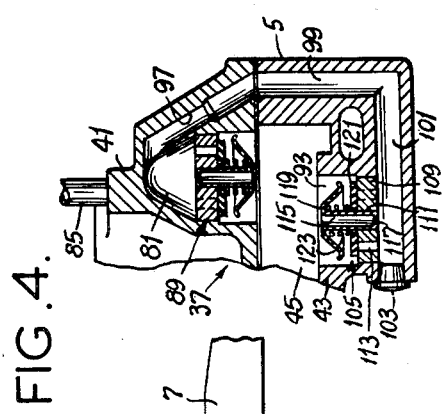
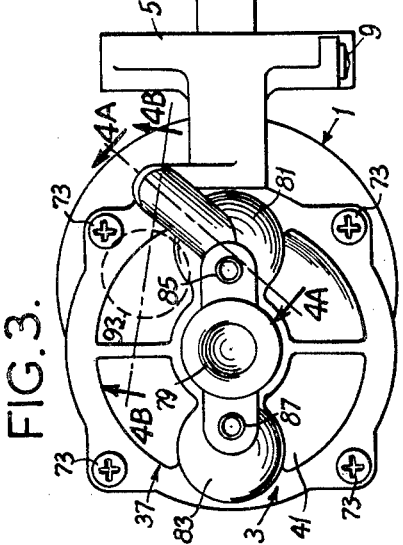
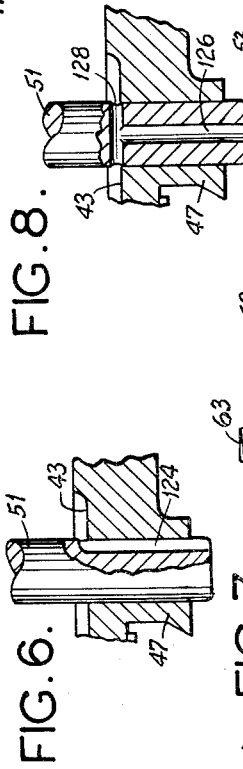
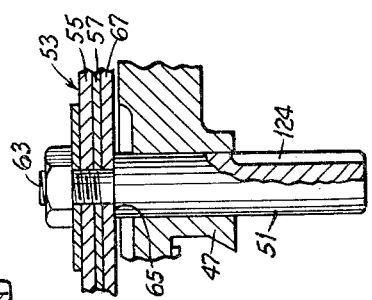
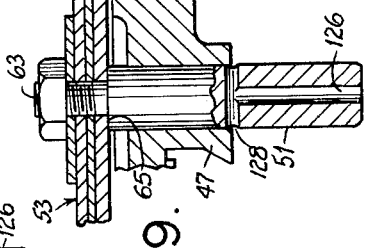
INVENTORS
DONALD R. COMPTON
JOHN P. PRATZKI
BY
AGENT United States Patent Office 3,045,896
Patented July 24, 1962

3,045,896
PUMP
Donald R. Compton, Belleville, Ill., and John P. Pratzki, St. Louis, Mo., assignors to ACF Industries, Incorporated, New York, N.Y., a corporation of New Jersey
Filed Nov. 12, 1959, Ser. No. 852,465
11 Claims. (Cl. 230—188)

This invention relates to vacuum booster pumps especially for use in conjunction with the engine of an automotive vehicle adapted to supplement the vacuum obtainable from the intake manifiold of the engine for effective operation of vacuum-operated automotive accessories, such as windshield wipers, and more particularly to a booster pump construction for such use.

The invention is directed to a double-acting piston booster pump having interconnected first and second check-valved inlets and first and second check-valved outlets on opposite sides of its piston. The first inlet and the first outlet are on one side above the piston, the second inlet and the second outlet are on the opposite side of the piston. A spring biases the piston downwardly in the direction away from the first inlet and outlet. The vacuum booster pump may be part of a combination fuel pump and booster pump unit including an engine-driven means such adapted to drive the piston in one direction. The inlets are connected to a vacuum-operated vehicle accessory, such as a windshield wiper. The first outlet is connected to the intake manifold of the engine, along with the stated vacuum-operated accessory. The second outlet opens to the engine crankcase.

When the manifold vacuum is sufficiently high and there is no need for operation of a vacuum-operated accessory, operation of the booster pump is not required, and it is preferable that the booster pump remain out of operation in order to prolong its useful life. Such a pump is adapted to be held out of operation in a static retracted position by manifold vacuum above the piston, provided the pressure on the bottom of the piston exceeds the pressure on the top of the piston by an amount sufficient to overcome the downward force of the spring. However, if there should be leakage at the check valve for the second inlet such that manifold vacuum is also in communication with the space below the piston, there results a pressure below the piston which will not be great enough to keep the piston up in retracted position. During use of booster pumps of this type, such leakage occurs with the result that during times when the booster pump is not needed, the pump piston moves into operation from its retracted position. This puts excessive loading on the pump driving means resulting in undue wear, noisy operation and eventual failure of the driving means.

Accordingly, it is an object of this invention to provide an improved booster pump construction adapted to insure sufficient pressure below the piston to keep the piston in retracted position at all times, where the pump is not needed.

A further object of the invention is the provision of a novel booster pump which will remain in a static retracted position at times when its operation is not needed.

It is another object of this invention to provide a novel booster pump which will automatically remain in a static, idle position at times when its operation is not needed to minimize wear and excessive loading on the pump driving means.

In general, these objects are attained by providing a bleed for admitting outside air to the pump below the piston when the piston is in its raised retracted position, thereby to provide sufficient pressure below the piston to hold it in retracted position, as long as manifold vacuum is relatively high. The bleed is closed as the piston moves away from retracted position and remains closed as the piston completes a downward stroke and returns substantially to retracted position, thereby avoiding any substantial loss of efficiency.

It will be understood that while the invention is herein described as it pertains to a double-acting piston type of pump such as shown in the stated copending application, it is also applicable to other types of pump, for example, it would be applicable to a diaphragm pump as distinguished from a piston pump.

Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a schematic showing of a combination fuel pump and vaccum booster pump unit, in which this invention is incorporated, mounted on the engine of an automotive vehicle;

FIG. 2 is a view in elevation of the combination fuel pump and vacuum booster pump unit of FIGURE 1 and on a larger scale than FIG. 1, with parts broken away and shown in section;

FIG. 3 is a plan view of the unit of FIG. 2;

FIG. 4 is an ideal vertical section of the unit shown in FIG. 2, the upper part thereof being in section on line 4A—4A of FIG. 3 and the lower part being in section on line 4B—4B of FIG. 3, the piston of the booster pump being omitted;

FIG. 5 is a view in elevation of FIG. 2 as viewed from the right, omitting an eccentric shown in FIG. 2;

FIG. 6 is an enlarged view of a fragment of the device shown in FIG. 2;

FIG. 7 is a view similar to FIG. 6 illustrating a moved position of parts;

FIG. 8 is a view similar to FIG. 6 showing a modification; and,

FIG. 9 is a view similar to FIG. 8 showing a moved position of parts.

Corresponding reference characters indicate corresponding parts throughout the several views of the drawings.

Referring to FIG. 1 of the drawings, there is indicated at A an automotive vehicle having an engine E on which is mounted a combination fuel pump and vacuum booster pump unit P in which the present invention is incorporated. Fuel is delivered from fuel tank T of the vehicle through a line L1 to the fuel pump part of unit P, and delivered by the latter through a line L2 to the carburetor C for the engine. As shown, there may be an electric pump EP in the tank for pumping fuel from the tank to unit P. The carburetor is mounted on the intake manifold M of the engine. An air filter F is mounted on the air horn of the carburetor. At W is indicated a vacuum-operated windshield wiper, which is representative of a vacuum-operated vehicle accessory, being the most usual vacuum-operated accessory. The vacuum booster pump part of unit P is connected in series-parallel relation with the wiper motor and the intake manifold of the engine by means of a vacuum circuit such as indicated at V, which may include a double check valve D.

Referring to FIGS. 2–5, the fuel pump part of unit P is designated 1 and the booster pump part of unit P is designated 3. These units have in common a rocker arm housing 5 and a rocker arm 7 pivoted at 9 in the housing. The unit is mounted on the engine as by means of an adaptor 11 with housing 5 in communication with the crankcase of the engine. Accordingly, housing 5 contains oil fumes from the crankcase. On the outer end of the rocker arm is a slidable shoe 13. When the unit is mounted on the engine, this shoe is engaged by an eccentric 15 on the engine cam shaft 17. A spring 19 biases the rocker arm in the direction (counterclockwise as shown in FIG. 2) to maintain the shoe in engagement with the eccentric.

The fuel pump 1 is a diaphragm type of pump. It may be of any appropriate design. The diaphragm 21 of the fuel pump is mounted at the lower end of a stem 23. The housing 5 includes a downwardly extending enclosure 25 for the diaphragm. A spring 27 in the enclosure biases the diaphragm 21 downwardly. The stem 23 extends slidably through a packing member 29 held at the upper end of enclosure 25 in an opening 31 between the housing 5 and enclosure 25. Spring 27 surrounds the stem. The latter extends upwardly into housing 5 and through a slot 33 in the enclosed end 8 of the rocker arm 7, and has a head 35 at its upper end. The rocker arm is engageable with head 35 for lifting the stem 23.

The booster pump 3 comprises an upwardly extending annular housing portion 39 which, as shown, is integrally formed as a part of housing 5 above the pump enclosure 25. Housing portion 39 is closed by a head 41 at its upper end to form an upper pumping chamber 44, and by a bottom end wall or partition 43, which is an integral part of housing 5 and defines a lower pumping chamber 45. The partition 43 is formed with a central bearing portion 47 in which is an opening 49. A piston rod 51 is vertically slidably mounted in opening 49, having a sufficiently loose fit in the opening as to provide a restricted passage around the rod through which oil fumes may enter the lower pumping chamber 45 for lubrication purposes. This passage is so restricted, however, as to avoid any substantial air leakage. Rod 51 extends downwardly, its lower end being engageable by the closed end of the rocker arm.

A piston 53 is fixed on the upper end of rod 51 in the chamber. Piston 53 comprises a pair of circular sheet metal plates 55 and 57 (see FIGS. 2 and 7). The upper plate 55 is a flat plate having a diameter slightly less than the inside diameter of the annular housing portion 39. The lower plate 57 has a downwardly extending annular cylindric skirt 59 and a flat rim 61 extending out from the edge of the skirt. The outside diameter of this rim is slightly less than the inside diameter of wall 39. The piston rod has a reduced-diameter upper end portion 63 providing an upwardly facing annular shoulder 65. Seated on this shoulder is a rigid circular backing plate 67 having a diameter somewhat less than the inside diameter of the skirt 59. Plate 57 is seated on plate 67 with the skirt 59 extending downward around the periphery of plate 67. The skirt 59 and rim 61 provide a groove 68 receiving a flat resilient packing ring 69, which may be made of a suitable oil-resistant synthetic rubber. The thickness of the packing ring is somewhat less than the width of this groove (the height of the skirt 59). Plate 55 is seated on the central portion of plate 57 and confines the packing ring in the groove. The packing ring 69 has a sliding sealing fit in chamber 45 and a sliding sealing fit against the skirt 59. With the thickness of ring less then the width of the groove, the ring has axial clearance in the groove and hence is free to expand axially when radially compressed, and to slide axially to some extent relative to the plates. Being free to expand axially, the ring readily adapts itself for sealing against the inside surface of wall 39, without requiring accurate machining of the latter. The construction is also such as to tend to hold the piston rod against canting in opening 49 and to tend to minimize heating. The plates 67, 57 and 55 may be made by stamping operations and do not require any machining.

The head 41 is constituted by a separate casting fastened to the wall 39 as by screws 73. It is formed with an axial recess 75 opening downward in the direction toward the pumping chamber 45. A coil compression spring 77 is received in this recess, reacting from the outer (upper) end of the recess against the piston 53 for driving it downward. The head is formed with a tapered axial projection 79 extending down in the recess for centering the spring and filling the space within the spring for volumetric efficiency of the pump. Projection 79 terminates short of the lower end of the recess 75 to provide space for the nut 71 when the piston 53 is at the upper end of its stroke. The lower surface of head 41, as viewed in FIGURE 2, will form a stop against which piston 53 will abut when it reaches a maximum retracted position under certain conditions of pump operation. The head 41 is formed with a vertical dome-shaped inlet passage 81 and a vertical dome-shaped outlet passage 83 located radially outward of the excess 75 and diametrically opposite one another. An inlet nipple 85 extends up from the head in communication with the inlet passage 81 and an outlet nipple 87 extends up from the head in communication with the outlet passage 83. The inlet passage 81 is provided with a check valve 89 adapted to open in the direction toward the pumping chamber 44 (downward) and the outlet passage 83 is provided with a check valve 91 adapted to open in the direction away from the pumping chamber (upward).

The partition 43 is formed with a vertical inlet passage 93 (see FIG. 4) and a vertical outlet passage 95 (see FIG. 2) located radially outward of the central piston rod bearing portion 47. The outlet passage 95 is generally directly below the outlet passage 83 in the head 41, and opens into the inner end of rocker arm housing 5. The inlet passage 93 instead of being diametrically opposite the outer passage 95, is angularly offset from the radial plane of passage 81 as appears in FIG. 3. FIG. 4, for convenience, is drawn with the parts appearing as if they were turned to bring passages 81 and 93 into the same plane. The head 41 has an inclined bore 97 extending up from its bottom intersecting the upper inlet passage 81. When the head is secured on the upper end of the annular wall 39, the lower end of bore 97 registers with a vertical bore 99 in the wall. Housing 5 has a horizontal bore 101 traversing the lower end of the lower inlet passage 93 and extending to the lower end of the vertical bore 99. The outer end of the horizontal bore 101 is plugged as indicated at 103 in FIG. 4. Bores 101, 99 and 97 provide a passage interconnecting the upper and lower inlet passages 81 and 93. The lower inlet passage 93 is provided with a check valve 105 adapted to open in the direction toward the pumping chamber 45 (upward). The lower outlet passage 95 is provided with a check valve 107 adapted to open in the direction away from the pumping chamber 45 and downwardly toward the interior of housing.

The check valves 89, 91, 105 and 107, as shown, are all identical. Each comprises a circular valve seat 109 having a central hole 111 and a series of ports 113, such as arcuate slots, around the hole 111. Press-fitted in the hole 111 is a hollow stem 115 closed as indicated at 117 at its end in the hole, and having its other end a mushroom head constituting a spring seat 119. A ring-shaped disk valve member 121, which may be made of a suitable oil-resistant synthetic rubber for cushioned sealing, is slidable on the stem 115, and is biased toward engagement with the valve seat by a coil compression spring 123 surrounding the stem reacting from the seat 119. As to each of the four check valves, the valve seat 109 is press-fitted and positioned horizontally in the respective passage 81, 83, 93, 95, with the disk valve member 121 and stem 115 on the appropriate side for inward or outward opening of the valve member, as the case may be. Thus, the stems 115 of the valve 105 for inlet passage 93 and the valve 91 for outlet passage 83 extend upward, and the stems 115 of the valve 107 for outlet passage 95 and the valve 89 for inlet passage 81 extend downward.

Piston 53 and piston rod 51 are adapted to occupy the raised retracted position in which they appear in FIG. 2 and to remain in this retracted position as long as the upward force on the piston due to the pressure of air in the lower pumping chamber 45 below the piston is equal to or greater than the downward force on the piston due to the pressure of air the upper chamber 44 above the piston and the downward thrust of spring 77.

In accordance with this invention, and as shown in FIGS. 2, 6 and 7, piston rod 51 is provided with a longitudinal groove 124 which extends upwards from the lower end of the rod to a point slightly above the bottom 43 of the pump housing 39 when the piston and piston rod are in retracted position (see FIGS. 2 and 6). Under these circumstances, groove 124 serves as a bleeder port for admitting air from rocker arm housing 5 into the pumping chamber 45 below the piston. When the piston and piston rod move downwardly away from retracted position, communication between the rocker arm housing 5 and chamber 45 via the groove 124 is immediately blocked, and remains blocked as the piston and piston rod complete a full downward stroke (see FIG. 7) and until they return substantially to retracted position. The piston 53 and the piston rod 51 are moved by the greater pressure in chamber 45 to a raised retracted position determined by engagement of the piston plate 55 with the lower end of the head structure forming the recess 75 and as shown in FIG. 2. In this position the lower end of the rod 51 is located above the high point of travel of the inner end 8 of the rocker arm 7 and accordingly is wholly disengaged from the rocker arm.

The operation of the booster pump 3 described above is that in which the upper pumping chamber 44 is connected through the inlet valve 91 and nipple 87 to the manifold M of the engine E. The manifold vacuum will establish itself within the upper chamber 44, due to the opening of the inlet valve 91. Also, manifold vacuum will be established in line V connecting the accessory W to the pump P. Due to the opening of valve 89 and the closing of valve 105, a high manifold vacuum in chamber 44 will tend to overcome spring 77 and permit piston 53 to move upwardly into a retracted position under the force of greater air pressure in the lower pump chamber 45. The groove 124 in piston rod 51 permits air at substantially atmospheric pressure to bleed into the lower pumping chamber 45, and to more effectively retain piston 53 in its upper retracted idle position.

Spring 77 can be provided with a resiliency such that piston 44 will be moved downwardly away from its retracted position, if the vacuum condition within upper pumping chamber 44 drops below some predetermined critical amount, such as, for example 18 inches of mercury. Such a condition would exist, for example, upon opening of the throttle for either acceleration or load conditions of engine operation. As the piston 53 is moved downwardly by spring 77, the piston rod 51 will contact the enclosed end 8 of lever 7, and thus place the booster pump 3 in operation.

The placing of the booster pump in operation does not automatically follow a drop in vacuum in the manifold M of the engine E. For example, during a condition of coasting downhill with closed throttle, in which the inertia of the vehicle A tends to drive the engine E, the vacuum in the manifold M will approach a maximum value in the order of 25 inches of mercury, for example. The high vacuum condition is established in the upper pumping chamber 44, as described above, to draw the piston 53 into its upper retracted idle position. If the vacuum in the manifold M is suddenly dropped to a point below the critical vacuum condition of 18 inches of mercury, the higher vacuum in the upper pump chamber 44 will immediately close the inlet valve 91 and retain the high vacuum condition within the upper chamber 44. This holds the pump out of operation in spite of lower vacuum in the engine manifold below the critical vacuum pressure. The pump will then not go into operation until the vacuum within the upper pumping chamber 44 falls below the critical vacuum, due to leakage into chamber 44 or due to the turning on of the vacuum driven accessory W.

When the vacuum driven accessory W is turned on, the vacuum conditions in the line X between the accessory W and the booster pump 3 will possibly vary in a range between 14 inches of mercury to 10 inches of mercury and lower, depending upon the load placed upon the accessory W and any leakage or bleeding of air into the system. The length of the stroke of the booster pump 3 is somewhat dependent upon the vacuum condition in the upper pumping chamber 44. Roughly, the length of pump stroke, or the extent to which the pump goes into operation, is a direct relationship to the drop in vacuum in the upper chamber 44 below the critical vacuum condition, which has been given for example as 18 inches of mercury.

In booster pumps of the type described, in which there is no groove 124 in the piston rod 51, it has been found that, due to possible leakage through the inlet valve 105 to the lower pumping chamber 45, a condition of high vacuum will be established within the lower pumping chamber 45. This provides an adverse effect, since a high vacuum in the lower pumping chamber 45 works against the upward pumping thrust of the lever 7. This condition during pump operation causes undue wear and excessive loading of the lever 7, with possible lever failure. Furthermore, leakage through the intake valve 105, resulting in the building up of a higher vacuum in the lower pumping chamber 45, will counteract the low manifold pressure in the upper pumping chamber 44, which retains piston 53 in its upward idle position when the pump is not in operation. This high vacuum in chamber 45 causes the booster pump 3 to stay in operation at all times when the accessory W is off. This, again, creates undue wear of the pump parts, and even results in chattering and noisy operation caused by the end 8 of lever 7 continually striking the piston rod 51.

The provision of the bleed groove 124 in piston rod 51, thus, provides several advantageous results. When the piston 53 is drawn upwardly to its retracted position, with the accessory W off, sufficient air will bleed through groove 124 to break any high vacuum condition created within the lower pumping chamber 45, and thus retain the piston 53 completely out of operative contact with the lever 7. Since, however, when the piston is in its retracted position, groove 124 extends only just above the upper surface of pump wall 43 and any downward movement of piston rod 51, caused by lowering of the vacuum condition within the upper pumping chamber 44 below the critical value, will immediately cut off groove 124 and permit the booster pump 3 to operate in a highly efficient manner. This use of a bleed into the lower chamber 45 only when piston 53 is in its uppermost position operates much more effectively than would a constant bleed at all positions of piston 53, which bleed would seriously affect the performance of the booster pump.

FIGS. 8 and 9 illustrate a modification wherein the bleeder port, instead of being constituted by a groove in the piston rod 51, is constituted by a longitudinal passage 126 extending upward from the lower end of the rod and a transverse passage 128 at the inner end of longitudinal passage 126. The transverse passage 128 is spaced from the piston a distance such that it is just above the bottom 43 of pump cylinder 37 when the piston and rod are in retracted position (see FIG. 8), and the function of ports 126, 128 is the same as that of groove 124.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A double acting booster pump adapted to be connected between a source of vacuum and a vacuum operated device, said pump comprising a housing, a piston slidably mounted within said housing and forming therewith a different pumping chamber on each side of said piston, a piston rod connected to said piston for providing movement of said piston within said housing to a retracted position, means to return said piston from said retracted position for pumping operation, means adapted to be connected to said vacuum operated device and forming an inlet to said housing, said housing including a passage from said inlet to said different pumping chambers, a first inlet valve closing said passage to one of said pumping chambers, a second inlet valve closing said passage to the other one of said pumping chambers, conduit means adapted to be connected to said source of vacuum and forming an outlet to said one pumping chamber, means forming an outlet passage from said other one pumping chamber, said piston rod having an air bleed passage formed with an opening extending into said other one pumping chamber upon movement of said piston into said retracted position.

2. A double acting booster pump adapted to be connected between a source of vacuum and a vacuum operated device, said pump comprising a housing, a piston slidably mounted within said housing and forming therewith a different pumping chamber on each side of said piston, means for providing reciprocating movement of said piston between said pumping chambers for pumping operation, said housing having an inlet thereto adapted to be connected to said vacuum operated device, said housing including a passage from said inlet to said different pumping chambers, a first inlet valve closing said passage to one of said pumping chambers, a second inlet valve closing said passage to the other one of said pumping chambers, said housing having an outlet from said one pumping chamber and adapted to be connected to said source of vacuum, means forming an outlet passage from said other one pumping chamber, a stop member within said one pumping chamber for stopping said reciprocating movement of said piston into said one pumping chamber, said means providing reciprocating movement of said piston including a piston rod connected to said piston and having a portion thereof extending through said housing forming said other pumping chamber, said piston rod portion having a passage formed with an inlet positioned to open into said other pumping chamber upon stopping of said piston by said stop member.

3. A double acting booster pump adapted to be connected between a source of vacuum and a vacuum operated device, said pump comprising a housing, a piston slidably mounted within said housing and forming therewith a different pumping chamber on each side of said piston, means including a piston rod connected to said piston for providing reciprocating movement of said piston between said pumping chambers for pumping operation, said housing having an inlet thereto adapted to be connected to said vacuum operated device, said housing including a passage from said inlet to said different pumping chambers, a first inlet valve closing said passage to one of said pumping chambers, a second inlet valve closing said passage to the other one of said pumping chambers, said housing having an outlet from said one pumping chamber and adapted to be connected to said source of vacuum, means forming an outlet passage from said other one pumping chamber and including an outlet valve therein, said piston rod having a portion thereof extending through said housing forming said other pumping chamber, said piston rod portion having a passage formed therein with an inlet positioned to open into said other pumping chamber upon the movement of said piston to a retracted position within said one pumping chamber.

4. In a double acting vacuum booster pump for use in conjunction with an internal combustion engine to supplement the vacuum obtainable from the intake manifold of the engine in response to drop in manifold vacuum, said pump comprising a cylinder, a piston movable in said cylinder, a piston rod connected to said piston and extending from said piston out of said cylinder, said cylinder having a first inlet and a first outlet at one end thereof and a second inlet and a second outlet at the other end thereof, said first and second inlets each having a different check valve adapted to open in the direction toward said cylinder, said first and second outlets each having a different check valve adapted to open in the direction away from said cylinder, said first and second inlets being interconnected and adapted for connection to a vacuum-operated accessory, said first outlet being adapted for connection to the manifold, spring means biasing said piston to move away from a retracted position at said one end of said cylinder, and means for driving said piston rod to drive said piston back toward retracted position, a port in said piston rod adapted to admit outside air into said other end of said cylinder when said piston is in retracted position, means blocking said port off from said cylinder as said piston moves away from retracted position.

5. In a vacuum booster pump as set forth in claim 4, said port being constituted by a longitudinal groove in said piston rod.

6. In a vacuum booster pump as set forth in claim 4, said port being constituted by a longitudinal passage extending inward from the outer end of said piston rod and a transverse passage at the inner end of said longitudinal passage.

7. In a double acting vacuum booster pump for use in conjunction with an internal combustion engine to supplement the vacuum obtainable from the intake manifold of the engine in response to drop in manifold vacuum, said pump comprising a rocker ram housing, a cylinder fixed to said housing, a piston rod having one end thereof extending from said cylinder into said housing, a piston fixed to said piston rod in said cylinder, said cylinder having a first inlet and a first outlet at the end thereof away from the housing and a second inlet and a second outlet at the other end thereof toward said housing, said first and second inlets each having a different check valve opening toward said cylinder, said first and second outlets each having a different check valve opening in the direction away from said cylinder, said first and second inlets being interconnected and adapted for connection to a vacuum operated accessory, said first outlet being adapted for connection to the manifold, spring means biasing said piston toward the housing away from a retracted position at said one end of said cylinder, and a rocker arm pivoted in said housing adapted to be driven by the engine and having one end engageable with said piston rod end to drive said piston back toward said retracted position, an air bleeder structure operatively connected to said piston and adapted to admit air from said housing into said other end of the cylinder when said piston is in retracted position, and means for closing said bleeder structure as said piston moves away from said retracted position.

8. In a double acting vacuum booster pump for use in conjunction with an internal combustion engine to supplement the vacuum obtainable from the intake manifold of the engine in response to drop in manifold vacuum, said pump comprising a rocker arm housing, a cylinder on the housing, a piston rod extending from the cylinder into the housing, a piston on the rod in the cylinder, said cylinder having a first inlet and a first outlet at the end thereof away from the housing, a second inlet and a second outlet at the other end thereof toward the housing, each inlet passage having a check valve adapted to open in the direction toward the cylinder, each outlet passage having a check valve adapted to open in the direction away from the cylinder, the inlets being interconnected and adapted for connection to a vacuum-operated accessory, the first outlet being adapted for connection to the manifold, spring means biasing the piston to move in the direction toward the housing away from a retracted position at said one end of the cylinder, and a rocker arm pivoted in the housing adapted to be driven by the engine, one end of the rocker arm being engageable with the end of the rod in said housing for driving the rod to drive the piston back toward retracted position, a port in the rod adapted to admit air from the housing into said other end of the cylinder when said piston is in retracted position, said port becoming blocked off from the cylinder as said piston moves away from retracted position, and remaining blocked as said piston completes a stroke in the direction toward said other end of the cylinder and until it returns substantially to retracted position.

9. In a vacuum booster pump as set forth in claim 8, said port being constituted by a longitudinal groove in the rod extending in the direction toward the cylinder from the end of the rod in the housing.

10. In a vacuum booster pump as set forth in claim 8, said port being constituted by a longitudinal passage extending from the end of the rod in the housing and a transverse passage at the inner end of said longitudinal passage.

11. In a vacuum booster pump as set forth in claim 8, said end of the rod being wholly disengaged from said end of the rocker arm when the piston is in retracted position.

References Cited in the file of this patent
UNITED STATES PATENTS

| | | |
|---|---|---|
| 1,374,156 | Carter | Apr. 5, 1921 |
| 2,002,318 | Hueber et al. | May 21, 1935 |
| 2,054,710 | Okada | Sept. 15, 1936 |
| 2,189,526 | Babitch | Feb. 6, 1940 |